May 22, 1962 R. L. BODELL ETAL 3,035,777
DISTRIBUTION SYSTEM FOR AGRICULTURAL LIQUIDS
Filed Nov. 10, 1959 3 Sheets-Sheet 2
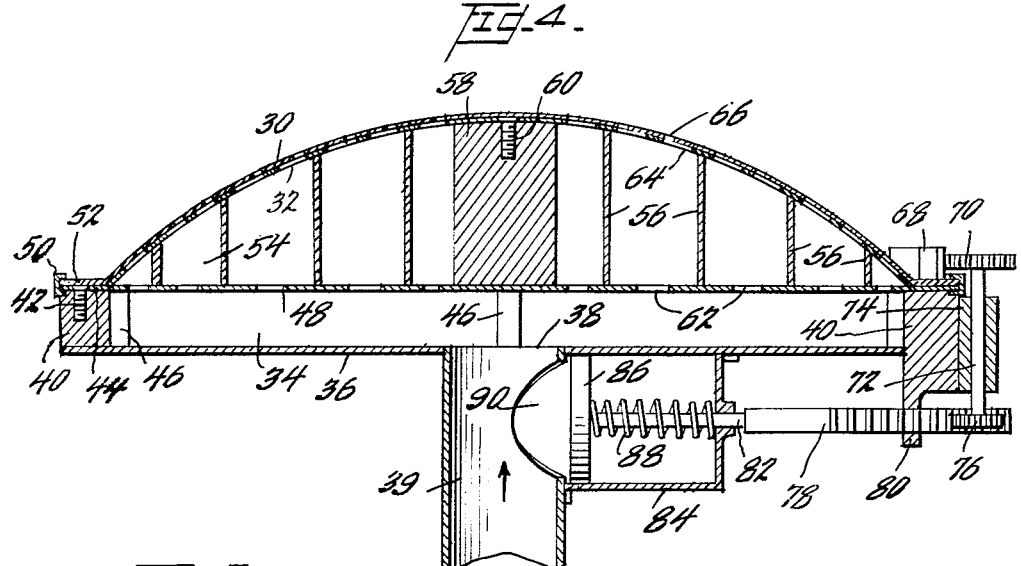
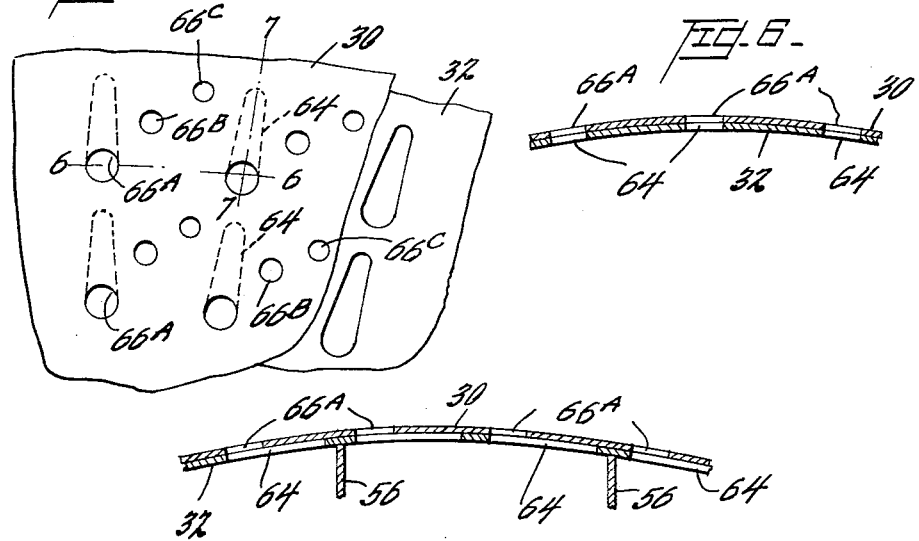
INVENTORS
Robert L. Bodell
Doris R. Bodell
BY Parker and Walsh
ATTORNEYS May 22, 1962   R. L. BODELL ETAL   3,035,777
DISTRIBUTION SYSTEM FOR AGRICULTURAL LIQUIDS
Filed Nov. 10, 1959   3 Sheets-Sheet 3
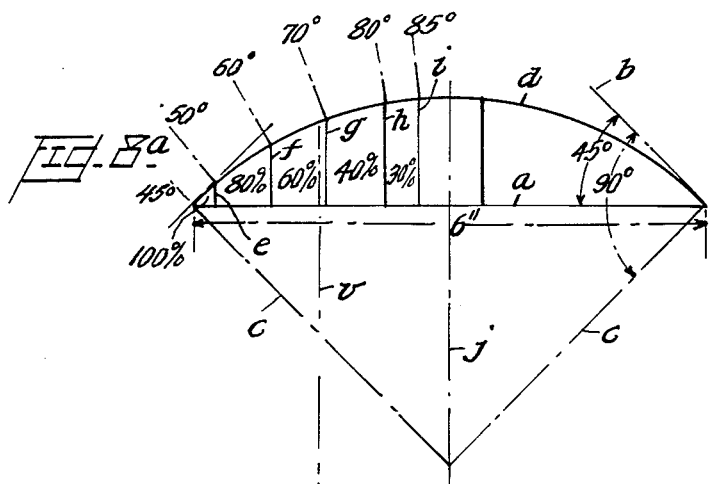
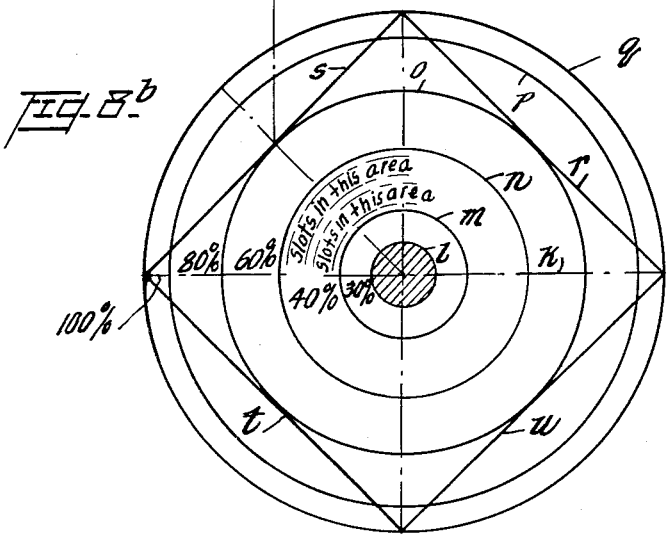
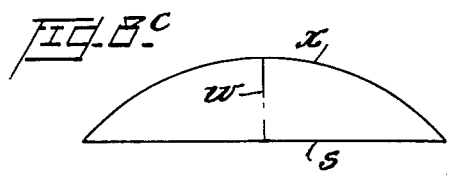
INVENTORS
Robert L. Bodell
Doris R. Bodell,
BY Parker and Walsh
ATTORNEYS United States Patent Office 3,035,777
Patented May 22, 1962

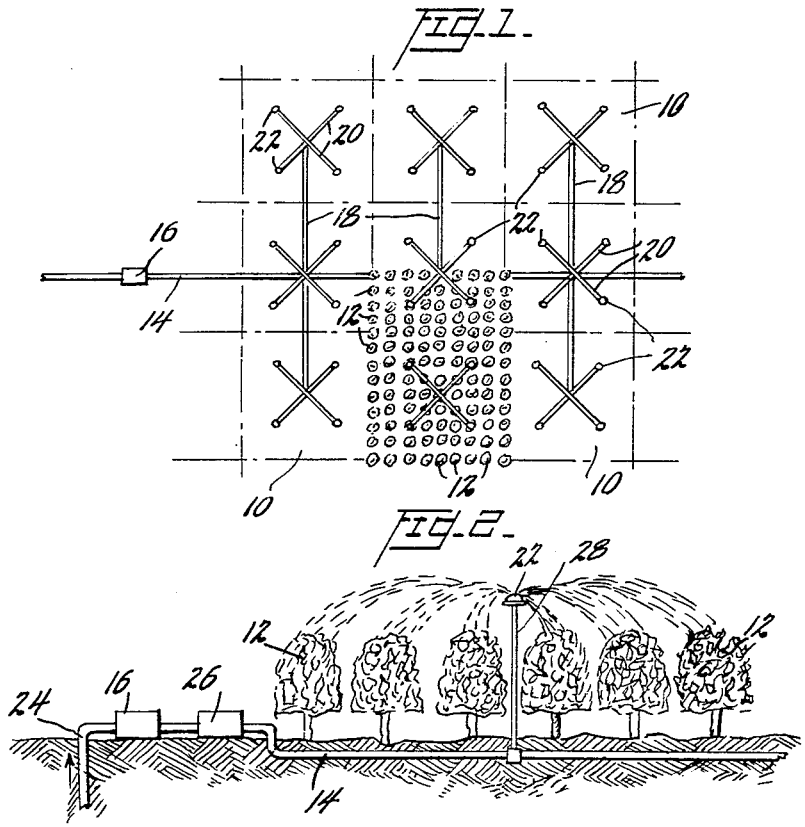

3,035,777
DISTRIBUTION SYSTEM FOR AGRICULTURAL LIQUIDS
Robert L. Bodell and Doris R. Bodell, Orlando, Fla.
Filed Nov. 10, 1959, Ser. No. 852,047
6 Claims. (Cl. 239—201)

This invention relates to a distribution system for agricultural liquids, to a system for preventing loss of citrus and truck crops by frost, and more particularly to a novel fluid spray head construction.

The greatest damage to citrus fruits and other succulent crops is caused by frost or by a dry freeze. It has been found that crops or plants which are treated constantly with a fairly heavy "rainfall" of water during a period of freezing air temperatures will not be damaged by frost or by a freeze, even though a coating of ice may form on the limbs, leaves, and fruit. The moisture introduced by the "rainfall," whether it attains the solid state or not, is sufficient to prevent the formation of frost and the resultant damaging dehydration.

The system of the present invention provides a means of distributing water or water soluble chemicals over large areas. It may be employed for the purposes of insect and fungus control, and irrigation, as well as for the prevention of damage to crops and vegetation by frost and freeze conditions. While systems for distributing agricultural liquids have been known for some time, they suffer from many defects, not the least of which are economic unfeasibility, inadequate water volume, improper water distribution, and variations in coverage due to pressure changes in the water supply. The present invention provides a liquid distribution system which overcomes or mitigates the defects of prior systems. It is accordingly a principal object of the invention to provide an improved liquid distribution system, especially for the distribution of agricultural liquids.

A further object of the invention is to provide a system adaptable to use by truck farmers, commercial flower and bulb growers, and operators of citrus groves, as a means of distributing water and water soluble chemicals in desired quantities and concentrations and without the use of portable equipment.

An additional object of the invention is to provide a system of the foregoing type capable of distributing liquid over a large area in a minimum of time and with a minimum of personnel.

Still another object of the invention is to provide a system of the foregoing type capable of producing a heavy and sustained water delivery simultaneously over all parts of a cultivated area for the purpose of preventing the formation of frost or nullifying the effect of a dry freeze, by supplying necessary moisture to preclude dehydration.

Yet another object of the invention is to provide a system of the foregoing type capable of producing a natural type of irrigation during drought periods, and capable of producing a precipitation which reaches not only the roots of the plants or trees, but also the above ground portions, thereby to prevent "sunburn."

A still further object of the invention is to provide a system of the foregoing type by which water may be sprayed gently over a cultivated area so that soil is not washed away as in trench-type irrigation systems.

A more specific object of the invention is to provide an improved spray head or nozzle capable of distributing water or water soluble chemicals in a square spray pattern, thereby preventing over-spraying in certain portions of the treated area and preventing the attendant waste of chemicals.

Another specific object of the invention is to provide a spray head capable of distributing water in a variety of concentrations, from "heavy rainfall" to a fine mist, according to the needs of the user.

Yet another object of the invention is to provide an improved spray head capable of automatic change from one aperture size to another by remote control.

An additional object of the invention is to provide a spray head of the last-mentioned type in which the effective aperture size is a function of the pressure of the liquid supplied to the head.

In general terms, the system of the invention distributes liquid from a suitable supply, such as a well or a natural source of water (a lake, stream, or river). The fluid distribution system includes main or trunk pipes and branch or feeder pipes, through which water is moved by a pump or pumps, the feeder or branch pipes terminating in spray heads. Where it is desired to distribute water soluble chemicals, chemical storage tanks and a hydromechanical device to meter the chemical into the system are included. The spray heads of the invention provide a variety of aperture sizes to meet the requirements of rainfall, spray, or mist and are constructed so that the effective aperture size can be varied by remote control. The construction of the spray head is such that the liquid is distributed over a rectangular or a square area, thereby precluding the liquid waste and the over-saturation of partial areas inherent in round spray heads.

The foregoing and other objects, features, and advantages of the invention, and the manner in which the same are accomplished will become more readily apparent upon consideration of the following detailed description of the invention when taken in conjunction with the accompanying drawings, which illustrate preferred and exemplary embodiments, and wherein:

FIGURE 1 is a plan view of part of a typical grove installation of the invention;

FIGURE 2 is an elevation view of a portion of the installation of FIGURE 1;

FIGURE 3 is a plan view of a spray head construction in accordance with the invention;

FIGURE 4 is a vertical sectional view of the spray head of the invention;

FIGURE 5 is a truncated plan view illustrating a detail of the spray head construction of the invention;

FIGURE 6 is a sectional view taken along line 6—6 of FIGURE 5;

FIGURE 7 is a sectional view taken along line 7—7 of FIGURE 5; and

FIGURES 8A, 8B, and 8C are explanatory diagrams illustrating the manner in which the spray head is developed.

Referring to the drawings, FIGURE 1 illustrates part of a typical grove of fruit trees to which the principles of the invention are applied. For example, the whole grove may consist of approximately 48 acres of gently rolling ground planted to the Department of Agriculture recommendation of 25 feet between tree bases. Each of of the large squares 10 represents one acre of land, and each of the circles 12 represents a tree. The distribution system of the invention comprises a main supply pipe 14 through which water is moved by a main pump 16 from a suitable water supply, such as a deep well. Secondary pipes 18 are connected to the main pipe 14 at suitable points and in turn are connected to feeder pipes 20 which terminate in spray heads 22. In the illustrative form of the invention, four spray heads are employed for each acre 10 of ground.

FIGURE 2 illustrates the supply system leading to a single nozzle 22, a deep well stand pipe 24 being shown connected to the pump 16, which may be gasoline or diesel engine driven. Also shown is a chemical tank 26 provided with a suitable flow meter, and a vertical supply pipe 28 at the top of which the spray head 22 is mounted. It will be noted that the spray head is located well above the tops of the trees 12, the spray of water or water soluble chemical being designated by the dash lines extending from the spray head. As will be described hereinafter, the pattern of water from each spray head is approximately square. Each spray head of the invention may have a maximum throw of about one hundred feet and a minimum throw of about 45 feet.

In the use of the invention for the prevention of frost or freeze damage to crops, water is pumped from the source at a temperature which preferably is no lower than 50° F.; the water temperature increases slightly during the pumping action. If a water-cooled internal combustion engine is employed to drive the pump, part of the water may be diverted through the cooling system of the engine, thereby raising the temperature of the water further. Chemicals may be injected into the water supply from the chemical supply tank 26 as the water passes to the spray heads 22. In passing from the spray head to the ground the water is chilled by air contact, thereby raising the air temperature within the spray area. Unless the freeze is of such severity as to freeze the water drops in the air, both the air and liquid temperature will remain well above 32° F., thereby preventing frost damage to the crops. In addition, the water spray will provide much needed moisture for the maturing crops. The period of operation of the system of the invention when it is used for frost prevention is not of sufficient duration to cause crop damage from excess water, the invention normally being operated from approximately midnight until drawn. Excess water may be drained off by small easily maintained ditches directed toward the water source, whereby the same water may be recirculated. Such drainage ditches also serve to alleviate the undesirable effects of heavy natural rainfall, and the pumps employed in the system of the invention may serve double duty by promoting the flow of water in drainage ditches as required.

The supply pipes from the pump may be buried to a depth of 15 to 18 inches under the ground surface to allow for uninterrupted cultivation. When the system of the invention is installed in a grove of planted trees, the pipes must be laid between the rows of trees and the spray heads off-set sufficiently to clear the root system. When the pipes are laid prior to planting, the problem of pipe alignment is obviated.

A preferred form of the spray head 22 is shown in FIGURES 3 and 4 and may be formed of a non-ferrous metal or rigid plastic domed plate 30 and a juxtaposed inner domed plate 32. The base of the spray head is in the form of a cylindrical base chamber 34 into which water enters from the main supply pipe 28 at substantially 100% line pressure. The bottom wall of the base chamber 34 is a flat disk plate 36 having a central opening 38 communicating with an inlet pipe 39 which may be threaded for connection to the vertical supply pipe 28. The side wall 40 of the base chamber is heavier in thickness than the bottom wall and is tapped at intervals around its circumference to accept countersunk screws 42 passing through an annular rim flange 44 on the inner domed plate 32 and which fix this plate to the wall 40 of the base chamber. A gasket may be provided between rim flange 44 and the top of wall 40 to prevent leakage.

Studs 46 formed on the inside of the wall 40 serve as supporting columns for the top wall of the base chamber, which is a disk plate 48. The outside of the wall 40 is provided with a groove at its top to receive one flange of an annular split ring 50 of channel cross-section, the other flange overlying the annular rim flange 52 of the outer domed plate 30 to hold the outer domed plate in place.

Between the disk plate 48 and the inner domed plate 32 is a spheroidal pressure chamber 54. Pressure chamber 54 is divided into a series of annular sub-chambers by concentric cylindrical walls 56. Walls 56 and a central column 58 serve to support the inner domed plate 32, which may be fixed to the central column by a countersunk screw 60. At the top of the central column and each sub-chamber wall 56 gaskets may be used to prevent leakage from one sub-chamber to another. Water passes from the base chamber 34 to the pressure chamber 54 (the sub-chambers thereof) through openings 62 in the wall 48 and passes out of the pressure chamber through openings 64 in the inner domed plate. As will be described more fully hereinafter, the sub-chambers are intended to contain water at different pressures, say from 100% line pressure to 30% line pressure. This is necessary to obtain equal distribution of water over the area to be covered. To create the desired water pressure in each of the sub-chambers, the number of inlet openings 62 is correlated with the number of outlet openings 64, the admission of water to the 100% line pressure sub-chamber being as unrestricted as possible, and the admission to the other sub-chambers being restricted as required to produce the desired water pressures.

The inner domed plate is immovable, being attached to the cylindrical wall 40 by the screws 42 in the manner previously described. The outer domed plate is movable with respect to the inner domed plate about their common axis, the movement being accomplished by a mechanism to be described hereinafter. The outer surface of the inner domed plate is polished to a mirror smoothness to facilitate rotation of the outer domed plate thereon, and to provide a water-tight fit with the outer domed plate.

Openings 64 are tapered slots through the surface of the inner domed plate 32. These slots, better seen in FIGURE 5, radiate from the center of the inner domed plate, at least one annular set of slots being provided for each of the annular sub-chambers. The outer domed plate has sets of openings 66 of different size which are arranged for selective registration with the slots 64 to determine the effective size of the discharge openings of the spray head. As shown in FIGURE 5, the orifices 66 are provided in several sizes, such as 66A, 66B, and 66C arranged in concentric rows. The orifices are staggered circumferentially so that only the orifices of one size may be aligned with the slots 64 at a given time. The slots 64 are tapered so that the width of the slots along their length matches the diameter of the corresponding outer dome orifices 66.

The effective size of the discharge passages of the spray head is controlled automatically to provide either a fine or heavy "rainfall" distribution of water. Such control is effected by changing the pressure of the water supplied to the spray head, as by varying the speed of the pump or pumps. The water pressure required to provide predetermined area coverage with a coarse spray is greater than that required with a fine spray.

Accordingly, the rim flange 52 of the outer domed plate is provided with an arcuate gear rack 68, the teeth of which are engaged by the teeth of a pinion 70 mounted on a shaft 72, which rotates in a journal 74 formed in an enlargement at one side of wall 40. Shaft 72 carries another pinion 76 at its outer end. This pinion meshes with a gear rack 78. The rack 78 reciprocates in a guide 80 formed as a projection from the wall 40 and has a piston rod 82 at one end passing through the end wall of a cylinder 84 to a piston 86, which reciprocates within the cylinder. A compression spring 88 surrounds the piston rod between the end wall and the piston. Water pressure in the pipe 39 is applied to the piston 86 through an opening 90 and drives the piston and the associated gearing to rotate the outer domed plate 30. The piston moves until the pressure of the water is balanced by the force of the spring 88. Reduction of pressure permits the spring to move the piston in the opposite direction. To produce a heavy spray, the water pressure is increased so as to rotate the outer plate 30 until larger orifices are aligned with the slot 64. A fine spray is produced by reducing the water pressure and rotating the outer plate until smaller openings are aligned with the slots. A plurality of spray heads may be controlled concurrently from a single pump control station, and the spray from specific heads may be adjusted separately by using auxiliary pumps and/or flow valves.

A square spray pattern is obtained by restricting the effective pressure chamber by side walls 92 which define a square perimeter configuration as shown in FIG. 3. The side walls extend from the disk plate 48 to the inner domed plate 32, intersecting the annular walls 56. The openings into and out of the pressure sub-chambers are limited to the areas within the confines of the side walls 92. Spray heads with other spray patterns may be constructed by merely modifying the side wall perimeter configuration and arranging the openings in the pressure chamber accordingly.

A preferred scheme for developing the construction of the spray head 22 is illustrated in FIGURES 8A, 8B, and 8C. In FIGURE 8A line $a$, say 6 inches in length, is laid out. At one end of line $a$ line $b$ is constructed at an angle of 45° to line $a$. This procedure is repeated at the opposite end of line $a$, and lines $c$ are drawn from the ends of line $a$ perpendicular to lines $b$. The intersection of lines $c$ becomes the center of an arc $d$ with a radius equal in length to the distance from the intersection to the end of line $a$. This procedure allows water at 100% line pressure to be sprayed from the apertures to be formed adjacent the end of the arc $d$ at an angle of 45° from the horizontal, which is the most effective angle.

To locate the annular walls of the pressure sub-chambers, the arc $d$ is intersected at intervals from 45° to 85°, and lines $e$ through $i$ are dropped from the arc perpendicular to line $a$. The same procedure is carried out on both sides of the center of the arc, and the pressure sub-chambers thus defined are intended to contain water at 100%, 80%, 60%, 40%, and 30% of the line pressure, respectively, as indicated. Smaller degrees of pressure are undesirable because additional pressure chamber areas would complicate the construction and manufacture of the spray head and would diminish the internal volume of each chamber to unacceptable dimensions. Moreover, the inherent dispersion factor in an unconfined stream of water makes more than five relative pressure areas unnecessary.

It will be seen that the construction defined in FIGURE 8A is a cross-section of the spray head like FIGURE 4. This cross-section is taken from corner to corner of the square side wall configuration of FIG. 3. A top view of this construction, corresponding to FIG. 3, is shown in FIGURE 8B and is developed as follows. Line $j$ is dropped from the center of line $a$ perpendicular thereto, and line $k$ is made perpendicular to line $j$ with the same length as line $a$. Lines $e$ through $i$ and the ends of line $a$ are then dropped down to form intersections with line $k$, and with the intersection of lines $j$ and $k$ as a center, a series of circles $l$, $m$, $n$, $o$, $p$, $q$ is described through the points of intersection along line $k$. This defines the annular pressure sub-chambers, the shaded area at the center constituting the central column 58 of FIGURE 4. To define the square configuration of the pressure chamber side walls, lines $r$, $s$, $t$, and $u$ are drawn between the successive intersections of the circle $q$ with lines $j$ and $k$.

FIGURE 8C illustrates the development of one of the pressure chamber side walls 92. To construct this figure, line $v$ in FIG. 8B is projected up from the midpoint of line $s$ perpendicular to line $a$ until it intersects the arc $d$. The distance from line $a$ to the arc $d$ along line $v$ is the maximum height of the side wall. In FIGURE 8C line $w$ equal to this length is drawn from the mid-point of line $s$ (having the same length as in FIGURE 8B) perpendicular thereto. An arc $x$ is then drawn through the ends of line $s$ and the upper end of line $w$. This arc then represents the curvature of the top of the pressure chamber side wall.

FIGURE 8B also illustrates the zones occupied by the slots in one pressure chamber area of the inner domed plate 32. The arcuate areas in which the slots are designated are separated from circles $m$ and $n$ and from each other by spaces which have widths approximately 10% of the distance between circles $m$ and $n$. The 80%, 60%, and 40% areas are provided with two rows of slots, while the 100% and 30% pressure areas have only one row of slots, as dictated by available space.

From the foregoing description it should be apparent that the invention provides an improved system for distributing agricultural liquids or the like and a unique spray head which may be used in such a system.

While preferred embodiments of the invention have been shown and described, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

The invention claimed is:

1. In a system for distributing agricultural fluid or the like, a fluid supply pipe, a spray head coupled to said pipe, said spray head being provided with a plurality of sets of fluid outlet openings each opening within a set being coordinated as to size with the other members of said set, each set being graduated in size and adapted to be selectively exposed to permit the escape of fluid therethrough, and means associated with said pipe and spray head for controlling the exposure of said openings in accordance with the pressure of the fluid supplied to said spray head from said pipe.

2. In a distributing system for agricultural liquid or the like, a liquid supply pipe, a spray head coupled to said pipe and adapted to produce a liquid spray pattern of predetermined configuration, said sprayhead having a domed, perforated discharge plate, wherein the perforations are arranged in zones according to the relative remoteness from the sprayhead, of the area reached by the spray pattern, an internal pressure chamber delimited by walls defining a rectangular configuration behind said plate, said chamber being divided into a plurality of sub-chambers each corresponding to a zone in the discharge plate and means within said head for establishing liquid in said sub-chambers at different pressures, according to that portion of the spray pattern reached by the liquid emanating from a given zone.

3. A spray head with a domed outer surface having a plurality of openings therethrough, and a chamber having side walls extending behind said surface and defining a rectangular chamber configuration, said chamber being divided internally into a plurality of sub-chambers communicating with said openings, said sub-chambers being defined by coaxial circular walls extending behind the domed surface, said sub-chambers being constructed to supply fluid to the openings communicating therewith at different pressures, respectively.

4. A spray head having a first plate with a plurality of sets of fluid discharge openings therethrough each opening within a set being coordinated as to size with the other members of said set, each set being graduated in size, and a juxtaposed second plate with a plurality of openings therethrough arranged to register selectively with certain openings in the first plate and to block other openings in the first plate, and means associated with said pipe and sprayhead responsive to the pressure of fluid supplied to said head, comprising a gear rack fixed to one of said plates and a pinion meshing with said gear rack, and said pressure-responsive means comprising a piston having a shaft coupled to said pinion for moving the inner and outer plates relatively to select the size of the effective fluid discharge openings of the spray head.

5. A spray head comprising inner and outer juxtaposed domed plates, said plates having selectively registerable openings therethrough to provide variable size discharge passages from said head, a spheroidal pressure chamber behind said inner plate, said chamber being defined by said inner plate and by a flat disk plate, said pressure chamber being divided into a plurality of sub-chambers by annular walls extending between said inner plate and said disk plate, a cylindrical base chamber behind said disk plate, said base chamber being defined by said disk plate, by a second disk plate spaced therefrom, and by an annular side wall, said domed plates having peripheral annular flanges juxtaposed with said annular side wall, the flange of the inner domed plate being fixed to said side wall, and the flange of the outer domed plate being movable over the flange of the inner domed plate, the first-mentioned disk plate having openings therethrough to provide communication between said sub-chambers and said base chamber, the second-mentioned disk plate having an opening therethrough adapted to be coupled to a source of fluid.

6. The spray head of claim 5, the first-mentioned disk plate being supported by peripheral studs from the second-mentioned disk plate, the inner domed plate having a central support extending from the first-mentioned disk plate, and the flange of the outer domed plate being held in juxtaposition with the flange of the inner domed plate by a circumscribing retainer ring.

References Cited in the file of this patent

UNITED STATES PATENTS

| | | |
|---|---|---|
| 517,544 | Dickens | Apr. 3, 1894 |
| 873,497 | Buell | Dec. 10, 1907 |
| 1,124,523 | Reeser | Jan. 12, 1915 |
| 1,168,612 | Durning | Jan. 18, 1916 |
| 1,186,226 | Parker | June 6, 1916 |
| 1,193,010 | Gibbs | Aug. 1, 1916 |
| 1,380,464 | Brooks | June 7, 1921 |
| 1,410,312 | Huffman | Mar. 21, 1922 |
| 1,632,611 | Lloyd | June 14, 1927 |
| 1,702,605 | Hartman | Feb. 19, 1929 |
| 2,865,830 | Zoldas | Dec. 23, 1958 |

FOREIGN PATENTS

| | | |
|---|---|---|
| 22,155/29 | Australia | Feb. 28, 1930 |